F. COULTAS AND A. PICK.
LIFTING APPARATUS FOR MOTOR ROAD VEHICLES AND THE LIKE.
APPLICATION FILED SEPT. 18, 1918.

1,327,905. Patented Jan. 13, 1920.

INVENTORS:
Fred Coultas
Arthur Pick
By Wm Wallace White
ATTY.

UNITED STATES PATENT OFFICE.

FRED COULTAS, OF BRADFORD, AND ARTHUR PICK, OF ELDWICK, BINGLEY, ENGLAND.

LIFTING APPARATUS FOR MOTOR ROAD-VEHICLES AND THE LIKE.

1,327,905. Specification of Letters Patent. Patented Jan. 13, 1920.

Application filed September 18, 1918. Serial No. 254,562.

*To all whom it may concern:*

Be it known that we, FRED COULTAS and ARTHUR PICK, subjects of the King of Great Britain, residing at 68 Paley road, Bradford, England, and Glen Road, Eldwick, Bingley, England, respectively, have invented new and useful Improvements in and Connected with Lifting Apparatus for Motor Road-Vehicles and the like, of which the following is a specification.

This invention relates to improvements in lifting apparatus for motor road vehicles and the like and refers more particularly to that class of lifting means wherein an arm having a base piece or foot is lowered into contact with the road surface and is then caused to exert pressure on the road surface and so lift the vehicle wheels from contact therewith, an example of this class of mechanism is known in the specn. of our British Letters Patent No. 110693.

Our present object is to arrange and construct a lifting gear operable either by hand or power in such wise that no strain is put upon the springs of the vehicle during operation or in other words the apparatus will be mounted in connection with the axle and chassis or frame of the vehicle entirely free from the ordinary springs. Shock and rebound means are arranged in connection with the axle as hereinafter described.

The invention consists in the matters hereinafter set forth and more particularly embodied in the appended claim.

Figure 1:
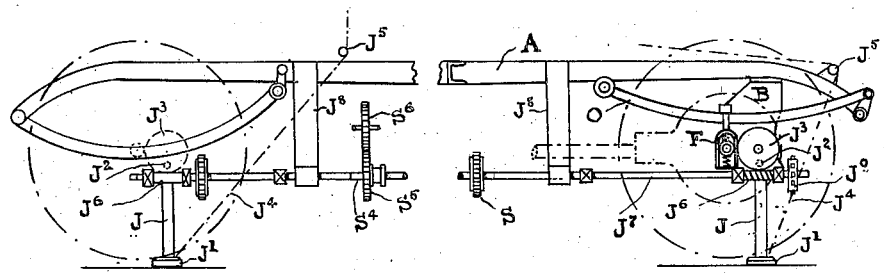
Figure 2:
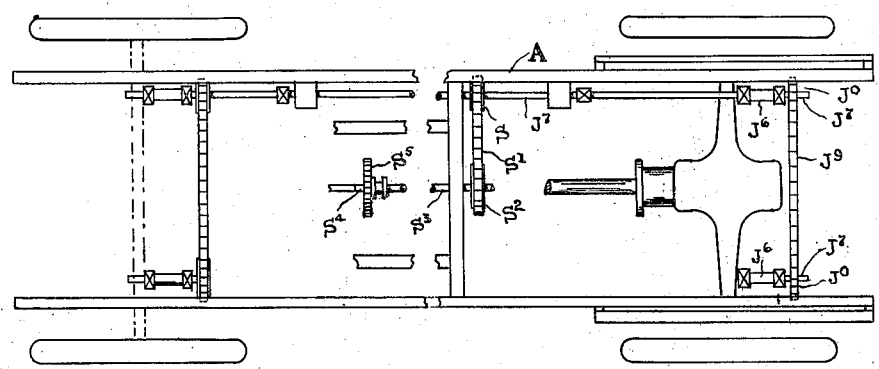
Figure 3:
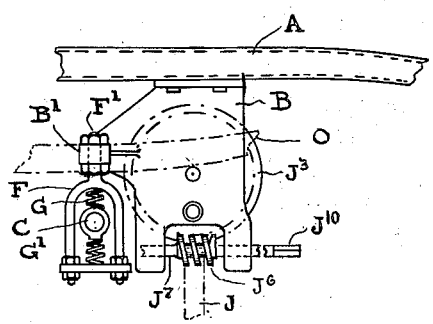
Figure 4:
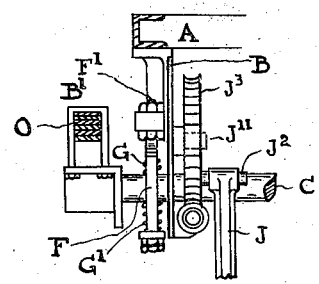

Referring to the drawings, Figure 1 represents a side elevation showing mechanism adapted to be operated by hand, or the power of the vehicle. Fig. 2. represents a plan of the mechanism shown in Fig. 1. Fig. 3 represents a side elevation showing the mechanism in detail and Fig. 4 represents a side view.

J represents the lifting arm provided with a suitable foot J'. The upper end of the arm J is pivotally attached as at $J^2$ to a disk or wheel $J^3$ arranged in such wise that as the disk is revolved the arm J will be moved toward or from the road surface. A suitable cord or the like $J^4$ will be attached to the arm J toward its foot and such cord will pass over a pulley or pulleys $J^5$ and be secured in any suitable manner and position near to the driver's seat. This cord serves to raise or lower the arm J out of or into the operating position and is a usual device for lifting arms, sprags or the like.

The disk or wheel $J^3$ is carried from a bracket B hereinafter more particularly described and the said disk or wheel is turned by means of a worm and worm wheel, the disk itself in the form shown being the worm wheel. $J^6$ is a worm also carried from the bracket B and mounted on a shaft $J^7$ carried by brackets such as $J^8$ from the vehicle frame A on one side of the vehicle. The shafts $J^7$ will carry on their outer ends chain wheels or pulleys $J^9$ and as there is lifting gear for each wheel, the pulleys $J^9$ for, say the front and back wheels, will be connected by chains or the like $J^9$. Each end $J^{10}$ of the shafts $J^7$ may be squared or otherwise formed for the reception of a winding key or handle and such handle may be placed on the most convenient shaft and the mechanism operated, that is all four wheels at once. To enable one wheel to be operated at once, each shaft has its own clutch gear which will be pressed into operation when the operator places the handle on to the shaft to be operated, such a clutch is not shown in detail as we may use any well known type of clutch.

In order to operate the lifting means by power the long shaft $J^7$ will be provided with a chain or like wheel S and such wheel will be connected by chains or like S' to another wheel $S^2$ mounted on a shaft $S^3$ on a counter shaft $S^4$ carrying a sliding gear wheel $S^5$ adapted to engage a gear wheel $S^2$ mounted on any part of the power unit which will run idly when the vehicle is stationary. The gear wheel $S^5$ being put into gear with the wheel $S^6$ by the driver by any suitable lever or like. The hereinbefore described mechanism has been described in our British specification No. 110693 previously referred to, said specification being published about Nov. 15th, 1917. If this mechanism were carried direct from the springs or axle it will be understood considerable movement would take place during operation and same would be liable to be disorganized therefore we have devised a bracket (or brackets) for carrying same in such wise that no strain is taken by the springs and shock and rebound means are provided as hereinafter described. Referring more particularly to Figs. 3 and 4 A represents the chassis or framework and O represents a spring, said spring in Fig. 3 being cut away to more clearly show the mechanism. C represents the axle. To the frame or chassis A we attach a bracket B and said bracket carries (in the preferred form) a boss or lug B'. This lug B' carries a stirrup like fitting F adapted to embrace but not touch the axle C. When the boss B' is carried from the frame A or formed therein the end F' of the stirrup F will be lengthened.

The axle C will normally be somewhat central in the stirrup F and in the top space a spring G will be fitted to act as a shock absorber when the vehicle spring deflects due to rough traveling or the like, and a spring G' will be fitted underneath the axle to take the rebound. The spring G' also takes the weight of the axle when the vehicle is jacked up and so entirely relieves the spring O of any load or thrust due to jacking.

The jack arm J is carried pivotally and eccentrically on the worm wheel or disk $J^3$ which is driven as hereinbefore described by a worm $J^6$ carried from the bracket B, substantially as shown. The disk $J^3$ being mounted on a pin stud or like $J^{11}$ carried by the bracket B.

The operation of the apparatus is as follows: Supposing that the arms J are now occupying a horizontal position, which is their normal position when traveling, through the actuation of the cords $J^4$, as previously explained. When it is desired to elevate the vehicle, the arms J are lowered to the position shown in Fig. 1, and the gears $J^3$ are now rotated through the worms $J^6$, so that the pin $J^2$ moves downwardly thus forcing the arms J toward the ground and thereby lifting the chassis A. Such an operation would not ordinarily effect a lifting of the axle and wheels of the vehicle because the lifting apparatus bears directly on the chassis thus allowing the vehicle springs to give under the weight of the wheels and axles, and thereby causing the latter to remain on the ground. However, in my invention, the lifting of the wheels and axles is insured by virtue of the stirrup F and the springs G', and in such manner that the vehicle springs are relieved of the weight of the wheels and axles.

We have shown a worm and worm wheel device for operating a jack arm, but wish it to be understood that we may employ other types of jack arms and operate them in other ways as long as we carry them from a bracket attached to the chassis or frame and arrange same in combination with a stirrup like device embracing the axle and provided with shock and rebound springs so as to entirely relieve the vehicle springs from thrust load due to using lifting jacks of any type and to support the axle while jacking is taking place and so act as a shock and rebound absorber.

Having explained our construction what we claim as our invention and desire to secure by Letters Patent is:—

In combination, a spring supported vehicle chassis, brackets secured to and depending from said chassis, stirrups carried by said brackets and encircling the axles of the vehicle, springs interposed between said stirrups and axles, and vehicle elevating means carried by said brackets.

In testimony whereof we have signed our names to this specification.

FRED COULTAS.
ARTHUR PICK.

Witnesses:
CLIVE WAUGH,
MARIE WALTON.